US006282496B1

(12) United States Patent
Chowdhary (10) Patent No.: US 6,282,496 B1
(45) Date of Patent: Aug. 28, 2001

(54) METHOD AND APPARATUS FOR INERTIAL GUIDANCE FOR AN AUTOMOBILE NAVIGATION SYSTEM

(75) Inventor: Mahesh Chowdhary, Cupertino, CA (US)

(73) Assignee: Visteon Technologies, LLC, Dearborn, MI (US)

(*) Notice: Subject to any disclaimer, the term of this patent is extended or adjusted under 35 U.S.C. 154(b) by 0 days.

(21) Appl. No.: 09/430,557

(22) Filed: Oct. 29, 1999

(51) Int. Cl.$^7$ .................................................. G01C 21/00
(52) U.S. Cl. ........................................ 701/220; 342/357.08
(58) Field of Search ................................. 701/213, 217, 701/220, 221, 214, 41; 342/357.08, 357.14, 457

(56) References Cited

U.S. PATENT DOCUMENTS

| 3,845,289 | 10/1974 | French | 235/151.2 |
|---|---|---|---|
| 4,139,889 | 2/1979 | Ingels | 364/460 |
| 4,254,465 | * 3/1981 | Land | 364/453 |
| 4,570,227 | 2/1986 | Tachi et al. | 364/444 |
| 4,608,656 | 8/1986 | Tanaka et al. | 364/449 |
| 4,611,293 | 9/1986 | Hatch et al. | 364/571 |
| 4,672,565 | 6/1987 | Kuno et al. | 364/571 |
| 4,673,878 | 6/1987 | Tsushima et al. | 324/226 |
| 4,723,218 | 2/1988 | Hasebe et al. | 364/449 |
| 4,734,863 | 3/1988 | Honey et al. | 364/449 |

(List continued on next page.)

FOREIGN PATENT DOCUMENTS

| 0 485 120 A2 | 5/1992 | (EP) . |
|---|---|---|
| 0527558A1 | 2/1993 | (EP) . |
| 0544403A1 | 6/1993 | (EP) . |
| 0 575 943 1 | 12/1993 | (EP) . |
| 2 271 423A | 4/1994 | (GB) . |
| 2107985 | 4/1990 | (JP) . |

OTHER PUBLICATIONS

French, *MAP matching Origins Approaches and Applications*, Rober L. French & Associates, 3815 Lisbon St., Suite 201, Fort Worth, Texas 76107, USA, pp. 91–116. (Month and Year are not available).

*Primary Examiner*—Tan Nguyen
*Assistant Examiner*—Dalena Tran
(74) *Attorney, Agent, or Firm*—Beyer Weaver & Thomas, LLP (57) ABSTRACT

The present invention discloses an improved vehicular inertial guidance navigation system, a.k.a. a dead reckoning system for navigation of a vehicle. The inertial guidance navigation system which may be used alone or in combination with other position determination means, such as GPS and map databases, to determine the location of a vehicle. The dead reckoning system has several advantages over existing systems. First, it can be easily mounted to the chassis of any vehicle. Second, it does not require any interface with existing sensors on the vehicle. Third, the system contains logic for removing errors in the position and heading determinations, brought about by angulation/rotation of the chassis and inertial guidance sensors, brought about by inclination or tilt of the chassis, with respect to an inertial/quasi-inertial frame of reference, such as the earth. The inertial guidance system includes: an inertial guidance sensor, a translation unit, and a logic unit. The inertial guidance sensor is suitable for coupling to the vehicle. The inertial guidance sensor senses motion of the vehicle in a non-inertial frame of reference and forming a sensor signal corresponding thereto. The translation unit is coupled to receive the sensor signal formed by the inertial guidance sensor. The translation unit translates the sensor signal into a quasi-inertial frame of reference and forms a translated signal corresponding thereto. The logic unit receives the translated signal formed by the translation unit and converts converting the translated signal into an estimated position and heading of the vehicle.

22 Claims, 7 Drawing Sheets

U.S. PATENT DOCUMENTS

| | | | |
|---|---|---|---|
| 4,751,512 | 6/1988 | Longaker | 342/357 |
| 4,758,959 * | 7/1988 | Thoone et al. | 364/454 |
| 4,782,447 | 11/1988 | Ueno et al. | 364/449 |
| 4,796,191 | 1/1989 | Honey et al. | 364/450 |
| 4,797,841 | 1/1989 | Hatch | 364/571.04 |
| 4,831,563 | 5/1989 | Ando et al. | 364/571.05 |
| 4,833,787 * | 5/1989 | Van Steenwyk | 33/302 |
| 4,862,398 | 8/1989 | Shimizu et al. | 364/571.05 |
| 4,903,212 | 2/1990 | Yokouchi et al. | 364/449 |
| 4,914,605 | 4/1990 | Loughmiller, Jr. et al. | 364/518 |
| 4,918,609 | 4/1990 | Yamawaki | 364/449 |
| 4,920,655 * | 5/1990 | Van Steenwyk | 33/304 |
| 4,926,336 | 5/1990 | Yamada | 364/444 |
| 4,937,753 | 6/1990 | Yamada | 364/444 |
| 4,964,052 | 10/1990 | Ohe | 364/449 |
| 4,970,652 | 11/1990 | Nagashima | 364/449 |
| 4,982,332 | 1/1991 | Saito et al. | 364/449 |
| 4,984,168 | 1/1991 | Neukrichner et al. | 364/449 |
| 4,989,151 | 1/1991 | Nuimura | 364/449 |
| 4,992,947 | 2/1991 | Nimura et al. | 364/444 |
| 4,996,645 | 2/1991 | Schneyderberg Van DerZon | 364/449 |
| 4,999,783 | 3/1991 | Tenmoku et al. | 364/450 |
| 5,040,122 | 8/1991 | Neukirchner et al. | 364/449 |
| 5,046,011 | 9/1991 | Kakihara et al. | 364/449 |
| 5,060,162 | 10/1991 | Ueyama et al. | 364/449 |
| 5,067,579 | 11/1991 | Kushi et al. | 180/197 |
| 5,119,301 | 6/1992 | Shimizu et al. | 364/450 |
| 5,148,884 | 9/1992 | Tsuyama et al. | 180/197 |
| 5,177,685 | 1/1993 | Davis et al. | 364/443 |
| 5,179,519 | 1/1993 | Adachi et al. | 364/449 |
| 5,220,509 | 6/1993 | Takemura et al. | 364/449 |
| 5,241,478 | 8/1993 | Inoue et al. | 364/426.02 |
| 5,272,638 | 12/1993 | Martin et al. | 364/444 |
| 5,283,743 | 2/1994 | Odagawa | 364/457 |
| 5,287,297 | 2/1994 | Ihara et al. | 364/571.02 |
| 5,293,318 | 3/1994 | Fukushima | 364/449 |
| 5,297,050 | 3/1994 | Ichimura et al. | 364/444 |
| 5,323,152 | 6/1994 | Morita | 340/988 |
| 5,369,588 | 11/1994 | Hayami et al. | 364/449 |
| 5,374,933 | 12/1994 | Kao | 342/357 |
| 5,383,127 | 1/1995 | Shibata | 364/449 |
| 5,410,485 | 4/1995 | Ichikawa | 364/444 |
| 5,412,573 | 5/1995 | Barnea et al. | 364/449 |
| 5,416,712 | 5/1995 | Geier et al. | 364/450 |
| 5,422,639 | 6/1995 | Kobayashi et al. | 340/988 |
| 5,434,788 | 7/1995 | Seymour et al. | 364/449 |
| 5,440,484 | 8/1995 | Kao | 364/424.01 |
| 5,463,554 | 10/1995 | Araki et al. | 364/444 |
| 5,486,822 | 1/1996 | Tenmoku et al. | 340/995 |
| 5,506,774 | 4/1996 | Nobe et al. | 364/424.05 |
| 5,513,110 | 4/1996 | Fujita et al. | 364/449 |
| 5,519,619 | 5/1996 | Seda | 364/444 |
| 5,521,826 | 5/1996 | Matsumoto | 364/449 |
| 5,550,538 | 8/1996 | Fujii et al. | 340/995 |
| 5,617,317 * | 4/1997 | Ignagni | 364/449.9 |
| 5,760,737 * | 6/1998 | Brenner | 342/357 |
| 5,862,511 | 1/1999 | Croyle et al. | 701/213 |
| 5,898,390 | 4/1999 | Oshizawa et al. | 340/988 |
| 5,912,635 | 6/1999 | Oshizawa et al. | 340/988 |
| 5,912,643 | 6/1999 | Chew et al. | 342/457 |
| 5,928,309 * | 7/1999 | Korver et al. | 701/214 |
| 5,986,547 * | 11/1999 | Korver et al. | 340/500 |
| 5,991,692 * | 11/1999 | Spencer, II et al. | 701/217 |

* cited by examiner

FIG. 1A $\text{Pitch}_{\text{Raw}} \approx \theta_{iy} + \theta_{ty}$
$\text{Roll}_{\text{Raw}} \approx \theta_{ix} + \theta_{tx}$
$\text{Yaw}_{\text{Raw}} \approx \theta_{iz} + \theta_{tz}$

FIG. 5

METHOD AND APPARATUS FOR INERTIAL GUIDANCE FOR AN AUTOMOBILE NAVIGATION SYSTEM

BACKGROUND OF THE INVENTION

Field of Invention

The present invention relates generally to vehicle navigation systems. More particularly, the present invention relates to an improved dead reckoning module for use in a vehicular navigation system.

Current vehicular navigation systems are hybrids which utilize one or more of the following position determining means to locate a vehicle. The positioning determining means include: global positioning system satellites (GPS), dead reckoning systems, and map databases. Typically, one among these systems will serve the primary navigation system function while the remaining determining means are utilized to re-calibrate cumulative errors in the primary system. Each determining means has its advantages and limitations.

GPS is an electromagnetic wave positioning system utilized to determine a vehicle's position. GPS includes Navstar GPS and its successors, i.e., differential GPS (DGPS), WAAS, or any other electromagnetic wave positioning system. Navstar is a GPS system which uses space based satellite radio navigation developed by the U.S. Department of Defense. GPS receivers provide users with continuous three-dimensional position, velocity, and time data when they have unobstructed view of at least four satellites. Navstar GPS consists of three major segments: space, control, and end-user segments. The space segment consists of a constellation of twenty-four operational satellites placed in six orbital planes above the Earth's surface. The satellites are in circular orbits and in such an orientation as to normally provide a GPS user with a minimum of five satellites in view from any point on earth at any one time. The satellite broadcasts a RF signal, which is modulated by a precise ranging signal and a coarse acquisition code ranging signal to provide navigation data. This navigation data, which is computed and controlled by the GPS control segment for all GPS satellites, includes the satellite's time, clock correction and ephemeris parameters, almanac and health status. The user segment is a collection of GPS receivers and their support equipment, such as antennas and processors which allow users to receive the code and process information necessary to obtain position velocity and timing measurements. There are two primary disadvantages to GPS positioning as it pertains to vehicular navigation. First, errors are imposed on the portion of the GPS signals accessible to civilians. The government imposes errors in the range of 100 meters. In urban environments, this can result in inadequate navigation capabilities due to the close proximity of streets, some of which are spaced apart by less than 100 meters.

The second disadvantage of GPS is that when the user is in urban environments with many scattering objects, such as buildings, it may not be possible to receive information from enough satellites to make an adequate position determination. For this reason, GPS is typically utilized in a hybrid navigation system with other position determining means such as dead reckoning and map databases.

Prior systems use a road network stored in a map database to calculate current vehicle positions. These systems send distance and heading information, derived from either GPS or dead reckoning, to perform map matching. Map matching calculates the current position based on the road network stored in the database and the input position and heading data. These systems also use map matching to calibrate sensors. The map matching, however, has inherent inaccuracies because map matching must look back in time and match data to a location. As such, map matching can only calibrate the sensors or serve as a position determining means when an absolute position is identified on the map. However, on a long straight stretch of highway, sensor calibration or position determination using map matching may not occur for a significant period of time.

Current land-based dead reckoning systems use vehicle speed sensors, rate gyros, reverse gear hookups, and wheel sensors to "dead reckon" the vehicle position from a previously known position. This method of dead reckoning is susceptible to sensor error and to cumulative error. Furthermore, systems that use odometers and reverse gear hookups lack portability due to the required connections. Moreover, the systems are hard to install in different cars due to differing odometer's configurations. Additionally, each odometer may generate a different number of pulse counts in the transmission. Odometer data also varies with temperature, load, weight, tire pressure and speed. Furthermore, connections to cruise control or ABS sensors may bring up safety concerns.

Accordingly, there is a need for a portable vehicular navigation system which is flexible, accurate, efficient and cost-effective in determining current position from a previous position.

SUMMARY OF THE INVENTION

The present invention discloses an improved vehicular inertial guidance navigation system, a.k.a. a dead reckoning system for navigation of a vehicle. The inertial guidance navigation system may be used alone or in combination with other position determination means, such as GPS and map databases, to determine the location of a vehicle. This dead reckoning system has several advantages over existing systems. First, it can be easily mounted to any vehicle. Second, it does not require any interface with existing sensors on the vehicle. Third, the system contains logic for removing errors in the position and heading determinations, brought about by angulation/rotation of the chassis and inertial guidance sensors or by inclination or tilt of the chassis, with respect to an inertial/quasi-inertial frame of reference such as the earth.

In an embodiment of the invention an inertial guidance system for navigation of a vehicle is disclosed. The inertial guidance system includes: an inertial guidance sensor, a frame transformation unit, and a logic unit. The inertial guidance sensor is suitable for coupling to the vehicle. The inertial guidance sensor senses motion of the vehicle in a non-inertial frame of reference and forms a sensor signal corresponding thereto. The frame transformation unit is coupled to receive the sensor signal formed by the inertial guidance sensor. The frame transformation unit transforms the sensor signal into a quasi-inertial frame of reference and forms a first signal corresponding thereto. The logic unit receives the first signal formed by the frame transformation unit and converts the first signal into an estimated position and heading of the vehicle.

In an embodiment of the invention a hybrid system for navigation of a vehicle is disclosed. The hybrid system comprises: an internal guidance sensor, a frame transformation unit, a first and second logic unit, and a position and heading determination means. The inertial guidance sensor is suitable for coupling to the vehicle. The inertial guidance sensor senses motion of the vehicle in a non-inertial frame of reference and forms a sensor signal corresponding thereto. The frame transformation unit receives the sensor signal formed by the inertial guidance sensor, transforms the sensor signal into a quasi-inertial frame of reference and forms a first signal corresponding thereto. The first logic unit receives the first signal formed by said frame transformation unit. The logic unit converts the first signal into an estimated position and heading of the vehicle and forms a first estimated position and heading signal corresponding thereto. The position and heading determination means forms a second estimated position and heading signal corresponding to an estimated position and heading of the vehicle. The second logic unit receives the first estimated position and heading signal formed by the first logic unit, together with the second estimated position and heading signal formed by the position and heading determination means, and estimates the position and heading of the vehicle therefrom.

In still another embodiment of the invention a method for navigating a vehicle is disclosed. The method comprises the acts of:

detecting an initial position and an initial heading of the vehicle;

sensing a motion of the vehicle in a non-inertial frame of reference;

transforming the motion sensed in said act of sensing into motion within a quasi-inertial frame of reference;

converting the motion within a quasi-inertial frame of reference into a position change and a heading change; and adding the position change to the initial position, and the heading change to the initial heading, to form, respectively, an updated position estimate and an updated heading estimate.

In another embodiment of the invention a computer program product for navigating a vehicle is disclosed. The computer program product comprises a computer-readable storage medium having computer-readable program code means embodied in the medium, the computer-readable program code means comprising:

computer-readable program code means for detecting an initial position and an initial heading of the vehicle;

computer-readable program code means for sensing a motion of the vehicle in a non-inertial frame of reference;

computer-readable program code means for transforming the motion sensed in said act of sensing into motion within quasi-inertial frame of reference;

computer-readable program code means for converting the motion within a quasi-inertial frame of reference into a position change and a heading change; and computer-readable program code means for adding the position change to the initial position, and the heading change to the initial heading, to form, respectively, an updated position estimate and an updated heading estimate.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF THE EMBODIMENTS

The present invention discloses an improved vehicular dead reckoning system which may be used alone or in combination with other position determination means, such as GPS and map databases, to determine the location of a vehicle. The dead reckoning system has several advantages over existing systems. First, it can be easily mounted to the chassis of any vehicle. Second, it does not require any interface with existing sensors on the vehicle, e.g., odometers, ABS, etc. The dead reckoning system uses inertial guidance sensors, including one or all of the following: 2/3 axis accelerometers, 2/3 axis angular velocity sensors, a 1/2/3 axis inclinometer, and a gravity meter. The inertial guidance sensors are mounted in the dead reckoning package 114 (see FIGS. 1B–D, 2) which is in turn fixed to the chassis of the vehicle. Third, the system contains logic for removing errors in the position and heading determinations, brought about by angulation/rotation of the chassis and inertial guidance sensors, brought about by inclination or tilt of the chassis, with respect to an inertial/quasi-inertial frame of reference such as the earth.

Figures 1A, 1B, 1C:
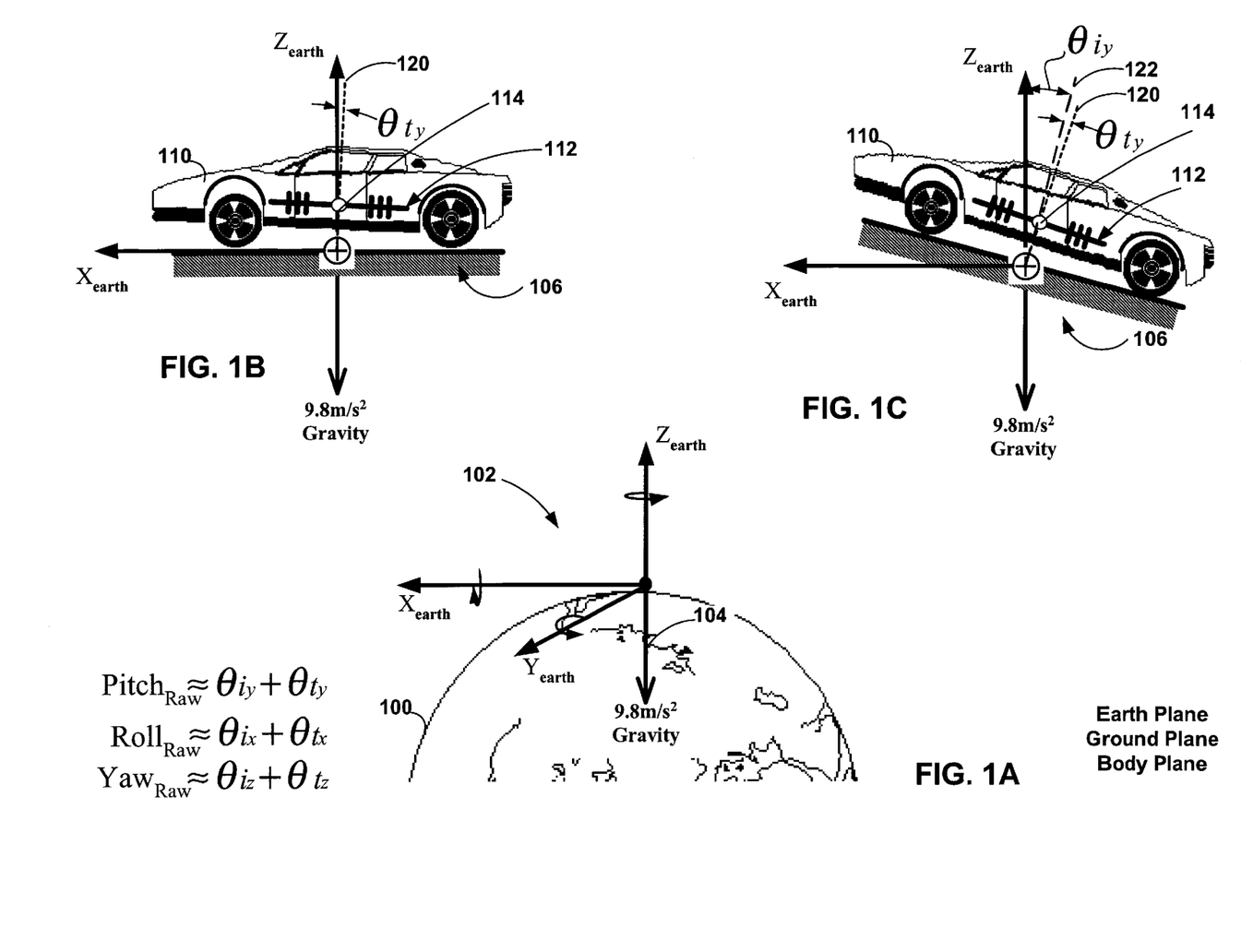
FIG. 1A shows a quasi-inertial frame of reference for a vehicular dead reckoning navigation system.
FIGS. 1B–1C are cross-sectional views of alternate orientations of a vehicle, with respect to the inertial frame of reference shown in FIG. 1A.

FIG. 1A shows a quasi-inertial a.k.a. "earth" frame of reference 102 for a vehicular dead reckoning system superimposed on a map of the Earth 100. That frame of reference includes orthogonal x, y, z axis. The origin of the axis is located at the earth's surface, and moves with the vehicle. In the examples shown, the positive x axis points generally along the direction of the vehicles forward motion and the negative z axis is aligned with the gravitational vector 104. An inertial reference is a frame in which Newton's first law is valid, i.e., "Every body continues in its state of rest, or in uniform motion in a straight line unless compelled to change that state by forces impressed upon it." The earth frame is a quasi-inertial frame of reference because of the small acceleration of such a frame relative to distant matter in the universe. The plane defined by the x and y axis shall be identified as the earth plane. About each axis of the earth frame are shown arrows which follow the "right hand rule". Rotation about the x, y and z axis are respectively defined as roll, pitch, and yaw.

In an embodiment of the invention roll and pitch of the vehicle can be calculated by integrating the signals from angular rate sensors for roll, pitch and yaw axis. The roll and pitch of the vehicle, calculated in this manner can be used to transform measured accelerations for the vehicle from a non-inertial to a quasi-inertial frame of reference. The approach itself is subject to several limitations. First, any offset error or bias in an angular rate signal will produce an error in the calculated angle after integration, and this error will increase linearly with time. Second, random noise in the signals from the angular rate sensors will produce a random walk in the calculated angle after integration. In another embodiment of the invention angulation of the vehicle is more accurately determined using a combination of angular rate sensors together with accelerometers or inclinometers. The signals from these instruments can be combined to produce measurements of the angulation of the vehicle that are accurate and stable for long periods of time (e.g. SEE FIG. 3).

Ideally, the sensors of an inertial guidance system would be kept in the earth plane. Practically, the sensor package is mounted to the chassis of the vehicle. The chassis does not stay in the earth plane and therefore the sensor package does not either. As the vehicle ascends a hill, it pitches about the y axis of the earth frame by an angular amount $\theta i_y$, equivalent to the slope of the incline, i.e., the ground plane, about the y axis. As the vehicle rounds a banked corner of a highway, it rolls about the x axis by an angle $\theta i_x$, equivalent to the slope of the bank, i.e., the ground plane, about the x axis. As the vehicle accelerates along the x axis, the chassis pitches about the y axis by an angular amount $\theta t_y$, equivalent to the tilt of the chassis with respect to the rear of the chassis. As the vehicle moves around curved road, tilt induced by centripetal acceleration causes the vehicle to roll about the x axis in an amount proportionate to $mv2/r$. The body plane, i.e., the plane of the chassis, may deviate from the earth plane, depending on either or both the incline of the ground plane or the acceleration\deceleration induced tilt of the vehicle. Such effects are exhibited about both the x, y and z axis of the earth plane. The accuracy of an inertial guidance system is affected by these deviations, each of which result in a projection of the gravity vector into the measurements of the x and y accelerometers. Similar considerations apply to errors induced in the 2/3 axis angular rate sensors, accelerometers or inclinometers. The present invention provides method and apparatus for removing errors in the measurements of the inertial guidance sensors induced by tilt/incline of the body plane with respect to the earth plane.

FIGS. 1B–C show side elevation views of a vehicle 110 resting on a ground plane 106. The ground plane 106 is defined by the patch of ground, e.g., hill, valley, incline, decline, etc., on which the vehicle is located. The chassis of the vehicle defines a body plane 112. The dead reckoning system 1 14, including the inertial guidance sensors, is affixed to that chassis. Any vehicular dead reckoning and navigation system attempts to define acceleration with respect to an inertial/quasi-inertial frame of reference. Therefore, deviations of the body plane brought about by either inclination of the ground plane with respect to the earth plane, or by a tilt of the body plane with respect to the ground plane brought about by acceleration or deceleration of the vehicle, produces an articulation of the instrumentation associated with the dead reckoning system which effects the accuracy of their readings.

In FIG. 1B, the vehicle is accelerating on a ground plane which is level with the earth plane. A normal 120 to the body plane is shown. The normal is offset by an angle $\theta t_y$ from the z axis due to the acceleration-induced tilt of the vehicle. Acceleration of a vehicle tends to elevate the front portion of the vehicle, while deceleration has the opposite effect. In FIG. 1C the vehicle is accelerating up a hill. The normal 122 to the ground plane is at an angle $\theta i_y$ with respect to the z axis. This inclines the body plane 112 of the vehicle with respect to the earth plane. Additionally, the acceleration of the vehicle results in an additional tilt $\theta t_y$ of the normal 120 to the body plane. Angulation about the y axis of the body plane with respect to the earth plane is $\theta i_y + \theta t_y$. This is approximately equal to the angulation about the y axis of the body plane with respect to the gravity vector. This angulation shall henceforth be identified as the angle to the gravity vector ($\angle g_y$) for the y axis. Similar angles to the gravity vector ($\angle g_x$), ($\angle g_z$) exist for the x and z axis. Henceforth, these angles will be variously identified as the angles to the gravity vector or "gravity angles". This angulation needs to be accounted for in determining vehicle position when accelerometers are used to detect motion of vehicle. For example, without correction, an x axis accelerometer would provide positive acceleration readings for a vehicle moving with constant velocity up an incline. This would be brought about by the deviation of the x axis sensor, brought about by the incline of the sensor package. As the x axis sensor is inclined with respect to the earth plane, it will generate a signal proportionate to the projection of the gravity vector 104 onto the ground plane. The magnitude of that contribution would be mg sin $\theta i_y$. Without correction, the x axis accelerometer of a vehicle decelerating while traveling up an incline might indicate acceleration, rather than deceleration, if the projection of the gravity vector 104 onto the ground plane was greater in magnitude than the deceleration of the vehicle.

Figure 1D:
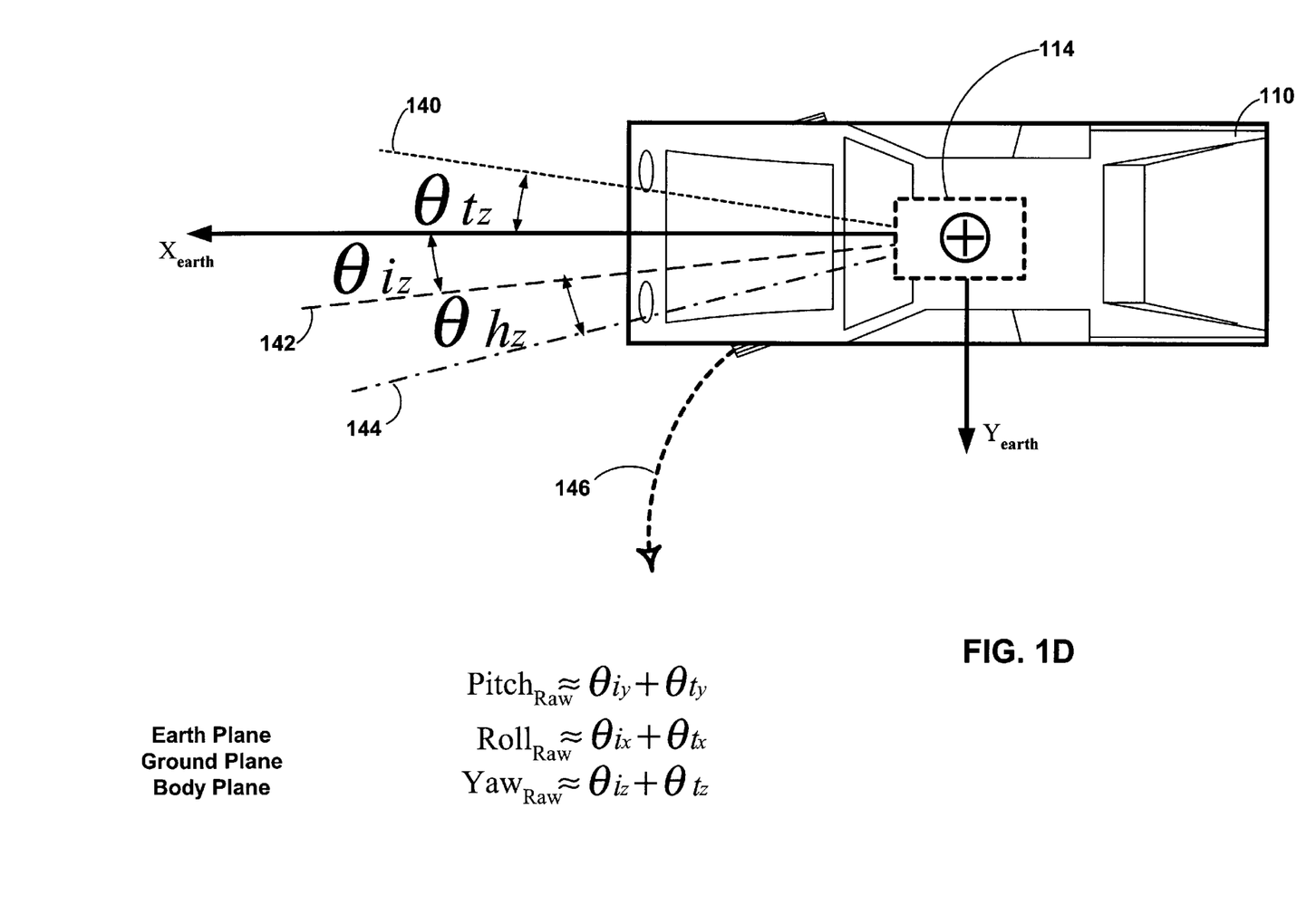
FIG. 1D is a top view of the vehicle initiating a left-hand turn, with respect to the inertial frame of reference shown in FIG. 1A.

FIG. 1D is a top view of the vehicle initiating a left-hand turn along path 146. The x and y axis of the earth frame are shown in the plane of the figure. The z axis is normal to the plane of the figure. The dead reckoning system package 114 is shown affixed to the vehicle's chassis. Three angles of interest for the dead reckoning package, with respect to the x axis of motion of the vehicle, are shown. The first of these, $\theta t_z$, is the yaw of the vehicle chassis around the z axis. Yaw of a vehicle is brought about by the momentum of a vehicle's chassis which tends to follow a straight line during a turn. Yaw increases in magnitude with the tightness of the turn radius, the speed of the vehicle, and the softness of the suspension. Each allows the chassis to deviate temporarily from alignment with the wheels. Line 140 defines the amount of the yaw for the example shown, i.e., $\theta z_y$. The second angle of interest is $\theta i_z$, which is the amount of the yaw induced in the vehicle as a result of the incline of the ground plane during a turn. For example, the bank of highway exit ramp would contribute both to yaw and roll. In the example shown line 142 reflects the amount of incline the induced yaw. The remaining angle of interest, $\theta h_z$, is the incremental change in heading over the measurement interval. In this instance, a change in heading brought about by the wheels of the vehicle following path 146 is shown by line 144. Without correction for the yaw induced by inclination and tilt, the actual heading of the vehicle would contain an error component.

For purposes of exposition, let us assume that each accelerometer of a three axis accelerometer array is aligned with the body plane and, respectively, the x, y, z axis of the earth frame, with the car at rest on level ground. Then, after corrections for offset, the accelerometer array will provide the following readings: $A_x = A_y = 0$ and $A_z = 9.8$ m/sec$^2$. Now, as the instrument package is rotated, lets say, due to incline of the ground plane and with the car still at rest, the accelerometer readings will change and the acceleration measured by $A_z$ will decrease.

Figure 1E:
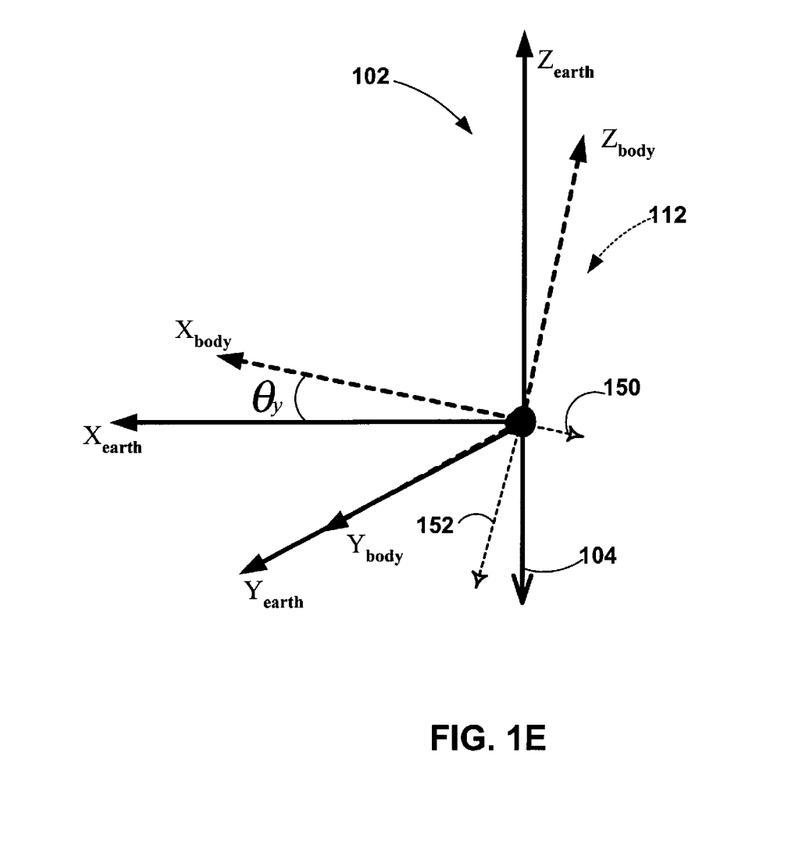
FIGS. 1E–F are side views of a quasi-inertial frame of reference and the rotation of the vehicle with respect to that frame of reference induced by inclination and acceleration together with inclination respectively.

FIG. 1E shows the body plane rotated only about the y axis, by an amount equal to $\theta_y=-15°$. Also shown is the gravity vector 104, as well as the projections of the gravity vector 150–152 on, respectively, the x and z axis of the non-inertial body frame of reference, defined by the chassis of the vehicle. The projection of the gravity vector 104 onto the x axis, i.e., vector 150 in the rotated frame of reference will have a magnitude of −2.5 [m/sec2] (see Equation 2). The x axis accelerometer will read: $A_x=-2.5$, indicating deceleration, when in fact there is none. To remove this effect, it would be necessary to determine the gravity angle $\angle g_y$, which is the negative of the rotation amount. In this case: $\angle g_y=+15°$. The product of the sine of the gravity angle and the gravitational constant is then subtracted from the measured reading from the x axis to remove the effect of the rotation of the body plane with respect to the earth frame. When the vehicle is moving at constant velocity, the same correction should be applied. Even when the vehicle is accelerating, the same correction should be applied, provided the gravity angle remains constant, i.e., the combined tilt and incline of the body plane about the y axis equals —15°. Thus, in this later instance, Ax equals a non-null value equivalent to acceleration in the earth frame along the x axis.

If we assume that pitch has a primary effect on the rotation of the body plane with respect to the earth frame, then it is also possible to determine gravity angle $g_y$, and to convert Ax to an inertial reading by the following equations, in which Az is the output of the accelerometer along the z axis in the non-inertial, i.e., body frame of reference:

$$\angle g_y = \arcsin(Az/-9.8) \qquad 1.$$

$$Ax \leftarrow (Ax-(\sin(\angle g_y)\cdot(-9.8))) \qquad 2.$$

$$\text{Gravitational Vector}_{(104)} = \Sigma \text{Projection Vectors}_{(150-152)} \qquad 3.$$

Equations 1–2 have been discussed above. Equation 3 reflects the fact that the sum of the projection vectors 150–152 on, respectively, the z and x axis of the rotated non-inertial body plane of reference equal to the gravitational Vector 104. Although pitch about the y axis is the primary cause of error in the inertial sensor readings, a secondary contribution to error is brought about by roll of the vehicle. Such a situation is shown in FIG. 1F.

Figure 1F:
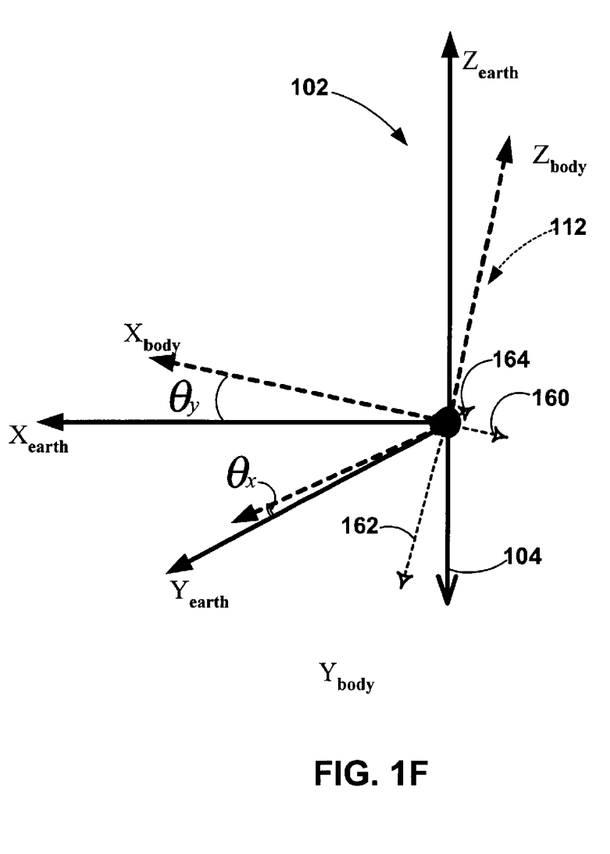

In FIG. 1F, both pitch and roll of the body plane with respect to the earth frame take place. The body plane is subject to pitch $\theta_y=-15°$ and to roll $\theta_x=-3°$, as would be the case when entering a thruway via an on-ramp. It remains the case that the sum of the projection vectors equal to the gravitational vector, as shown in the following equation 4.

$$\text{Gravitational Vector}_{(104)} = \Sigma \text{Projection Vectors}_{(160-164)} \qquad 4.$$

A unique solution exists for the true acceleration in the quasi-inertial frame of reference when the vehicle is experiencing both pitch and roll. For example where pitch, i.e., $\theta_y=-15°$ and roll, i.e., $\theta_x=3°$, the acceleration measured along the y axis will be 0.259 g and along x axis will be 0.052 g, as expressed by the following equations.

$$\text{Pitch } \theta_y = \sin^{-1}(0.259 \text{ g/g}) = 15°$$

$$\text{Pitch } \theta_x = \sin^{-1}(0.052 \text{ g/g}) = 3°$$

Figure 2:
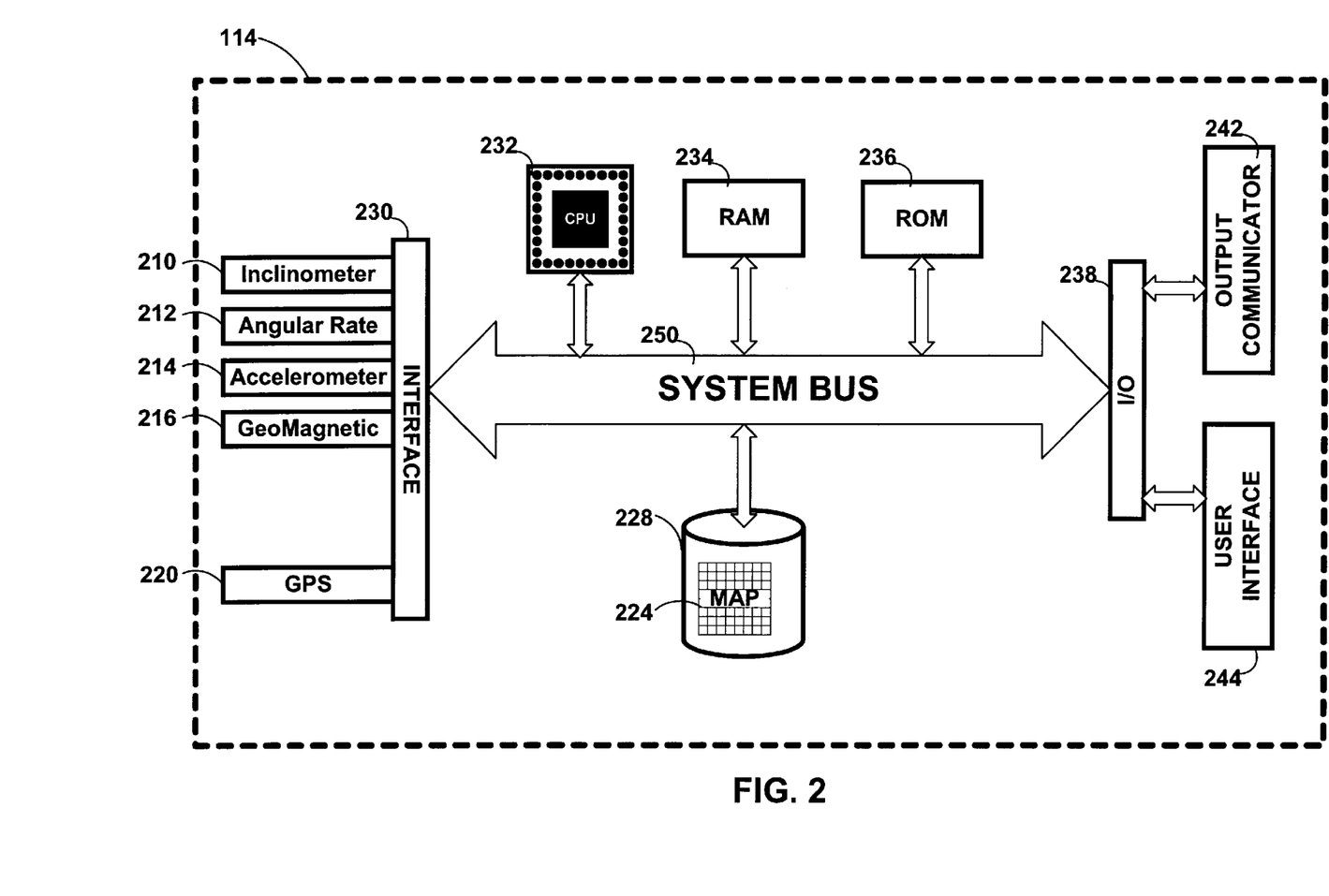
FIG. 2 is a hardware block diagram of the components of an embodiment of the vehicular navigation system.

FIG. 2 is a hardware block diagram of the components of a hybrid embodiment of the vehicular navigation system. The package 114 contains inertial sensors 210–216 which include an inclinometer, angular rate sensors, accelerometers and geomagnetic sensors, respectively. Additionally, a GPS module 220 is shown. All of the sensors are coupled via an interface 230 to the system bus 250. CPU 232, RAM 234, ROM 236, main memory 228, and the I/O interface 238 are also shown coupled to the system bus. The output communicator 242 and the user interface 244 are shown coupled to the I/O interface 238. In an embodiment of the invention, the inertial sensor has the following capabilities. The inclinometer 210 is a two-axis device which senses both pitch and roll of the body plane with respect to the earth plane and forms a sensor signal corresponding thereto. The angular rate sensor 212 is a three-axis device which measures roll, pitch and yaw and forms a sensor signal corresponding thereto. The accelerometer 214 is a three-axis device which senses acceleration of the vehicle and forms a sensor signal corresponding thereto. The optional geomagnetic sensor 216 measures the compass heading of the vehicle and forms a sensor signal corresponding thereto.

In addition to the inertial sensors, GPS module 220 is provided. The GPS module receives signals from, for example, a satellite-based navigation system. Data from the inertial sensors as well as the GPS module is transmitted to the CPU 232 which performs the processes described and discussed in connection with the following FIGS. 3–5. The main memory 228 contains a map database 224 as well as an associative program code for implementing both map matching and GPS positioning, as well as dead reckoning, in accordance with the processes discussed in the following FIGS. 3–5. RAM 130 permits reading and writing of the information necessary to execute such software programs. ROM 236 may contain the system BIOS. I/O interface 238 receives data processed by CPU 232 and transmits the data to output communicator 242 for presentment to the user as audio, video, text, or any combination thereof. The user may input data, such as desired destination, through user interface 244. That interface may be a keyboard or voice recognition system.

The map database 224 stored in main memory 228 may comprise positional data such as latitude and longitude coordinates to describe road intersections or nodes, road segments, landmarks and points of interest, and other geographical information. The database may further comprise data representing characteristics of roads or places on the map, such as road and place names, road features such as dividers, one-way restrictions, surface speed limit, shape, elevation and other properties. Additionally, the map database may include the cost values associative with individual nodes and road segments. These cost values might record estimates of time intervals for traversing the respective node or segments. Segment cost may reflect road characteristics, such as speed limit or segment length, both of which affect travel time along the segment. Additionally, the database may include road rank values which relate to the category or type of road: alley, city street, country road, freeway, etc.

Figure 3:
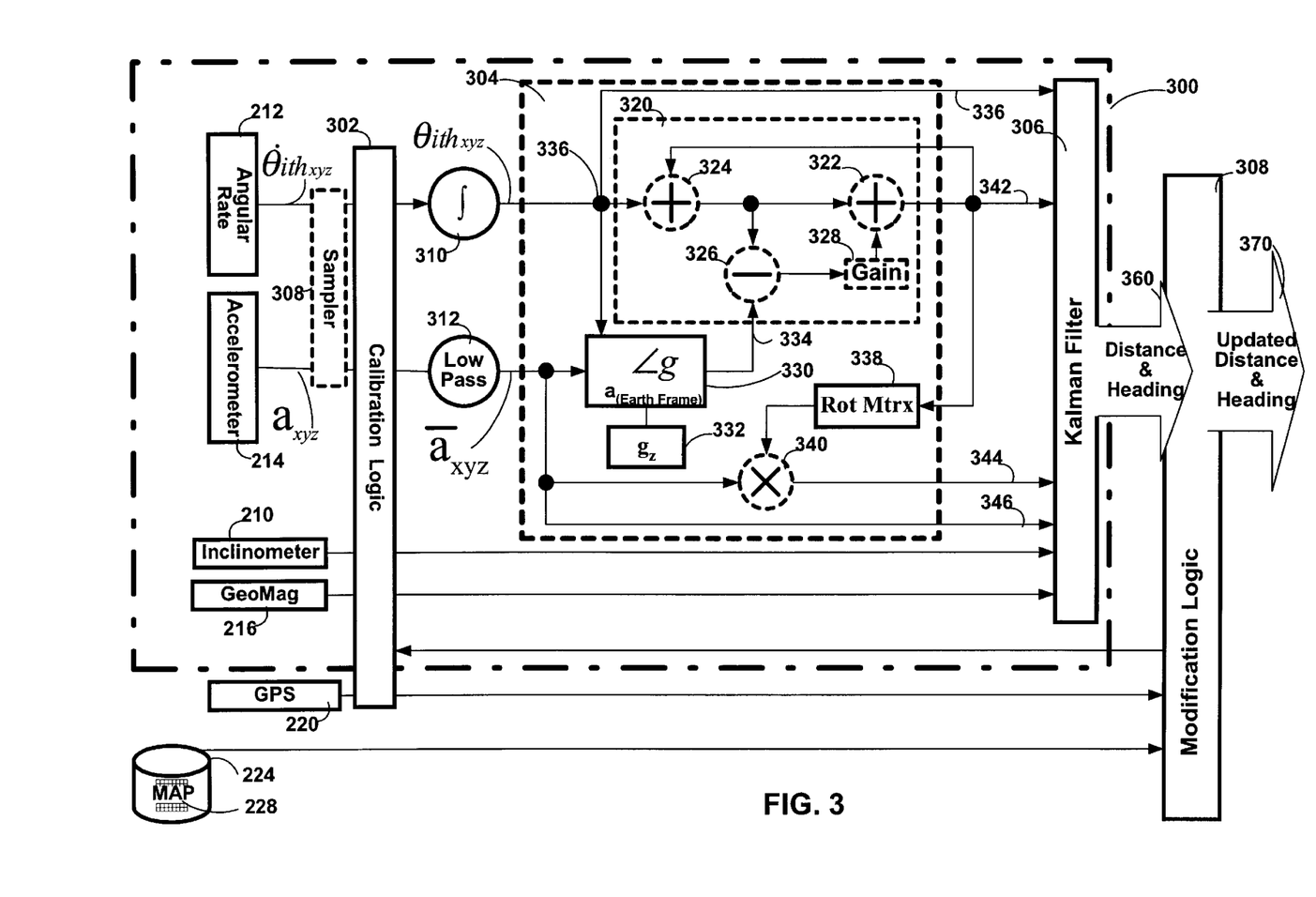
FIG. 3 is a software/hardware block diagram of an embodiment of the dead reckoning portion of the vehicular navigation system.

FIG. 3 is a software/hardware block diagram showing a detailed embodiment of the dead reckoning/inertial-guidance module 300 within a hybrid vehicular navigation system. The logic/processes disclosed herein may be implemented on the hardware discussed above, in connection with FIG. 2.

The dead reckoning/inertial-guidance module 300 includes: inertial guidance sensors 210–216, calibration logic 302, integrator 310, low pass filter 312, frame transformation unit 304 and Kalman filter 306. The frame transformation unit includes: inertial reference module 330, gravity module 332, inertial rotation module 320, multiplier 340 and rotation matrix 338. In an embodiment of the invention a sampler 308 is also included. The inertial rotation module includes a subtractor 326 adders 322–324 and gain module 328. The hybrid system also includes other position/heading determination modules such as the GPS module 220 and map database 224. The outputs of the dead reckoning/inertial-guidance module 300 the GPS module 220 and the map database 228 are provided as inputs to the modification logic 308.

The outputs of the angular rate sensors and accelerometers are passed to the Kalman filter via the frame transformation unit 304. This unit provides logic for transforming the sensor output into an inertial frame of reference. The output 360 of the Kalman filter, i.e., a signal corresponding to the distance and heading of the vehicle as determined by dead reckoning, is provided as an input to the modification logic 308. The modification logic, in the embodiment shown, accepts input from other inertial guidance sensors, e.g., inclinometer 210 and geomagnetic module 216. The modification logic additionally accepts input from other position determining modules; e.g., GPS module 220 and map database 228. The modification processes integrate the distance and heading as determined by the dead reckoning system with distance and heading as determined by other position determination means, such as GPS and map databases. Shifts of either position or heading are performed. An updated distance and heading 370 is output by the modification processes. Additionally, recalibration of sensors may also be performed via signals sent from the modification logic to the calibration logic 302. Further details of two embodiments for the modification logic are provided in FIGS. 4–5 and accompanying text.

The processes performed by the frame transformation unit 304 converts the sensor output of both the angular rate sensors 212 and accelerometers 214 into an inertial frame of reference. This includes removing errors in position and heading due to inclination and tilt of the inertial guidance sensor package 114 (see FIGS. 1B–D). In the embodiment shown, both the angular rate sensors and accelerometers are three-axis devices. The output of the angular rate sensor is the angular velocity along the x, y and z axes including the effects of inclination, tilt of the sensor package and changes in heading. The output of the accelerometer is acceleration along the x, y and z axes, including errors therein resulting from inclination and tilt of the sensor package. In alternate embodiments of the invention, both the accelerometers and angular rate sensors would be two-axis devices. The angular rate sensors would measure angular velocity about the z axis (yaw rate) and either the x or y axes (roll or pitch rate). The accelerometers would measure acceleration along the x and z axes. In still another embodiment of the invention, dead reckoning would be performed utilizing only 2/3 axis accelerometers without the angular rate sensors.

Processing begins by sampling at sampler 308 the inertial sensor outputs, i.e., angular rate sensors 212, accelerometers 214, inclinometer(s) 210, as well possibly as the geomagnetic sensor 216 outputs and passing these to the calibration logic 302. The GPS module 220 output is also coupled to the calibration logic. The calibration logic accepts control input from the modification logic 308, to recalibrate the outputs of the inertial guidance sensors. Recalibration may involve applying an updated zero offset and scale factor, as determined by the modification processes, to the outputs of each of the above-discussed sensors, before subjecting them to further processing. Recalibration does not, however, remove errors due to changes in the gravity angle of the inertial guidance sensor package, i.e., rotation of the sensor package into a non-inertial frame of reference.

After recalibration, the outputs of the angular rate sensors and accelerometers are provided as inputs to, respectively, the integration module 310 and low pass filter module 312. The integration module 310 converts angular velocity to raw angle $\theta ith_{xyz}$, which includes both heading changes as well as changes in the orientation of the sensor package due to both incline and tilt. The low pass filter 312 time-averages the measured acceleration. The outputs of the integrators and low pass filter modules are passed to the frame transformation unit 304. Specifically the output 336 of the integration module 310, i.e., the raw angle of the vehicle in a non-inertial/body frame of reference, is provided as an input to the inertial rotation module 320. The output 346 of the low pass filter 312, i.e., the raw acceleration vector in a non-inertial/body frame of reference, is provided as an input to the inertial reference module 330

The inertial reference module 330 accepts the sampled values for average acceleration along the x, y, z axis. This module projects the measured accelerations into a quasi-inertial/earth frame of reference. In the process, both the angulation of the body plane (and the sensor package) with respect to the earth frame (the gravity angles) and the magnitude of the measured accelerations projected into the earth frame (inertial accelerations) are determined. In an embodiment of the invention, the process for projecting the measured accelerations into the quasi-inertial/earth frame of reference involve determining an appropriate rotational scale factor for the x and/or y axis acceleration measurements based on the requirement that the z axis measurement correspond in the quasi-inertial frame of reference to at least one of: a gravitational constant and/or the magnitude of the gravity vector at the location of the vehicle. The rotational scale factor may be expressed in terms of the gravity angle. The determination of the gravity angle may range from the simple to the complex.

Gravity may be a constant or a variable. In an embodiment where gravity is a variable, a gravimeter 332 provides continuous input to the inertial reference module 330 for performing the above-mentioned calculations or variations thereon. In another embodiment where gravity is a constant, e.g., 9.8 m/sec$^2$, gravity module 332 performs as a register outputting a constant value to the inertial acceleration module. The inertial acceleration module provides the angle of the body plane with respect to the gravity vector, a.k.a. the gravity angle, as an input to the subtractor 326 portion of the frame transformation unit 320.

The frame transformation unit 320 also accepts as input the at summer 324 the output of the integrator 310, i.e., the vehicle's roll, pitch as a function of time at signal 336. The summer adds these samples to a feedback signal corresponding to corrected angle of the vehicle orientation in earth frame from previous samplings as provided on line 342. The output of the summer 324 is provided as input both to summer 322 as well as differencer/subtractor 326. The angles to gravity vector provided by inertial reference module 330 are subtracted at subtractor 326 from the raw angles output by summer 324 to produce an error signal. The error signal output is provided as input to variable gain module 328. The error signal provided by the subtractor is used to correct the raw angles calculated by integration of angular rate sensor output. This error signal is multiplied by variable gain 328, for each axis and is provided as an input to summer 322. The gain term determines the amount of error signal that gets used to obtain corrected angles indicating vehicle's orientation in earth frame. In other words, the value of the gain determines the time constant at which the error signal corrects the angular rate sensor raw angle signal. In an embodiment of the invention the gain factor and therefore the time constant may be varied to match the road segment on which the vehicle is currently located, as indicated by the map database. In this embodiment of the invention the map database will store information for the heading, shape, length, and location of each road segment as well as the incline of the road segment. Using this information the time constant can be set depending on the maneuvers which the vehicle will go through at a given point of time. For example, making a short turn on a city street takes 4 seconds, and the sample rate at which sampler 308 is 100 Hz, then the value for gain parameter for roll axis can be set to $$R = \frac{1}{4 \times 100} = 0.0025$$

Now this error signal (after multiplication with gain) is added to the uncorrected or raw angle at summer 322. This summation will result in corrected angles that describe vehicle's orientation in an earth frame. This angle stabilization process through gain term will be dominated on a shorter time scale by angular rate sensor output (which is more reliable on shorter time scales.) On longer time scale, the stabilization process will be dominated by accelerometer data (which is more reliable on longer time scales). Therefore, this process produces corrected angles 342 which are reliable for both shorter and longer time periods.

The gain parameter 328 will have default values for each axis. But these can be modified based on vehicle's present location in map database, level of confidence in this location, and expected maneuver that lies ahead. For a turn on city street (no change in elevation) at constant speed, the roll axis gain term will see largest variation. For interstate exit ramp of cloverleaf shape, both roll and pitch terms will need variations. The history of the effect of each gain term on calculated angles for common maneuvers can be saved for adaptively adjusting the gain term for particular vehicle and for particular driving style. To a map database, which currently includes the length and shape of a road segment, it is desirable to add data as to inclination and road bank angle information into the map database to help this process.

The output of summer 322 on signal line 342 is provided as an input to the Kalman, or other suitable covariance filter 306. Additionally, that same signal is provided as feedback to the rotation module 338 which implements a rotation matrix. The output of the rotation module, i.e., the rotation matrix is multiplied by multiplier 340 times the raw accelerations provided by the low pass filter 312 to produce true accelerations. These true accelerations are also provided as input to the Kalman filter 306 on signal line 344 along with the raw accelerations on signal line 346. The operation of the rotation matrix is shown in the following example:

Consider the acceleration vector $\vec{a}$ written as $\vec{a}_1 = a_x \vec{i} + a_y \vec{j} + a_z \vec{k}$ where $\vec{i}, \vec{j}, \vec{k}$ are unit vectors along x, y, z axes and $a_x, a_y, a_z$ are components along these axes which are in the vehicle frame. In order to remove the effect of vehicle tilt (i.e., roll, pitch), the acceleration vector can be transformed to quasi-inertial earth reference frame using the correct angle (roll, pitch) forming a rotation matrix shown:

$$\vec{a}_2 = R_{21} \vec{a}_1$$

Where $$R_{21} = \begin{bmatrix} 1 & 0 & 0 \\ 0 & \cos\theta_x & \sin\theta_x \\ 0 & -\sin\theta_x & \cos\theta_x \end{bmatrix} \begin{bmatrix} \cos\theta_y & 0 & -\sin\theta_y \\ 0 & 1 & 0 \\ \sin\theta_y & 0 & \cos\theta_y \end{bmatrix} \begin{bmatrix} \cos\theta_z & \sin\theta_z & 0 \\ -\sin\theta_z & \cos\theta_z & 0 \\ 0 & 0 & 1 \end{bmatrix}$$
$$\text{Roll } (\theta_x) \qquad \text{Pitch } (\theta_y) \qquad \text{Yaw } (\theta_z)$$

This rotation matrix will rotate the measured acceleration vector to produce pure acceleration. The corrected angles are used to form above-mentioned rotation matrix within rotation matrix module 338. This rotation matrix is multiplied by raw acceleration vector to obtain true acceleration vector (in earth frame) which is used to calculate distance and velocity.

In an alternate embodiment of the invention the processes shown in module 304 (See FIG. 3) may be complemented or improved by use of a quarternian to show the evolution of both the gravity vector (gravity angle) as well as the true acceleration, i.e,. acceleration in a quasi-inertial frame of reference as a function of time. A quaternion is a four parameter representation that uniquely describes a body's orientation with respect to reference frame.

$$q = q_0 + q_1\vec{i} + q_2\vec{j} + q_3\vec{k} \quad q_0 = \cos\xi/2 \quad q_1 = \alpha\cdot\sin\xi/2, \quad q_2 = \beta\sin\xi/2,$$
$$q_3 = \gamma\sin\xi/2$$

is the magnitude of vector. When a change of orientation occurs, a new quarternion can be computed using angular rates from rate sensors and quarternion rates using $$\begin{Bmatrix} q'_0 \\ q'_1 \\ q'_2 \\ q'_3 \end{Bmatrix} = \frac{1}{2} \begin{pmatrix} -q_1 & -q_2 & -q_3 \\ q_0 & -q_3 & q_2 \\ q_3 & q_0 & -q_1 \\ -q_2 & q_1 & q_0 \end{pmatrix} \cdot \begin{pmatrix} r' \\ p' \\ y' \end{pmatrix}$$

r'=roll, p'=pitch, y'=yaw

Solution of this differential equation may be implemented in digital or analog logic.

The Kalman filter 306 may also be provided with inputs from the inclinometer 210 and a geomagnetic sensor 216 to improve accuracy 302. In still another embodiment of the invention the Kalman filter is provided with additional inputs, including the raw angle 336, and the non-inertial acceleration vector 346.

The Kalman filter 306 implements covariance determination processes well known to those skilled in the art. The inertial sensors and frame transformation module provide accelerations and angulation of the vehicle transformed into a quasi-inertial frame of reference as inputs to the Kalman filter. The Kalman filter is formed using a set of recursive formulae which make it suitable for real time computing implementation on a digital computer. The Kalman filter utilizes: knowledge of dynamics of the system and sensors used; knowledge of the statistical description of measurement noise, process noise and uncertainties in dynamics of system and sensor model together with initial conditions of variables of interest. The Kalman filter may be used to fuse measurements from multiple sensors to provide an estimate of current state of system and also predict the future state of system. The Kalman filter updates position and heading determinations from an initial position and an initial heading by successively adding subsequent changes in position and heading, thus forming updated estimates of distance and heading 360 for the vehicle.

In a hybrid embodiment of the invention, such as that shown, the distance and heading provided by the Kalman filter is provided to the modification logic 308. In another embodiment of the invention, the output of the internal guidance system 360 is used exclusively for distance and heading determination without combination into a hybrid system. In other embodiments of the invention, the dead reckoning/inertial guidance portion of the system is utilized in either a master-slave (see FIG. 4), slave-master (see FIG. 5), or peer-to-peer control relationship with others of the position and heading determination means. In these embodiments, the modification logic 308 accepts inputs from both the GPS module 220 and map database 228. In still another embodiment of the invention, the inertial guidance system 300 includes only 2/3 axis accelerometers 214, coupled to the Kalman filter via the inertial reference module 330. This system although less accurate than the combined accelerometer and rate sensor embodiment discussed above, may nevertheless provide suitable position and heading determinations for certain applications.

As will be obvious to those skilled in the art, other vehicle position determination means in addition to, or in substitution for, the above-mentioned GPS module and map database may be utilized in a hybrid system, without departing from the scope of the invention. The acceleration/angular rate sensors discussed above have specific alignment with respect to each other and the vehicle chassis, i.e., orthogonal to each other and with the positive z axis normal to the chassis of the vehicle. As will be obvious to those skilled in the art, neither orthogonality of the sensors to one another, nor to the chassis is required in order to practice the invention. Without departing from the scope of the claimed invention, additional logic can be added to adjust the translation module outputs to account for either changes of the orientation of the sensors to one another, or to the chassis of the vehicle.

Figure 4:
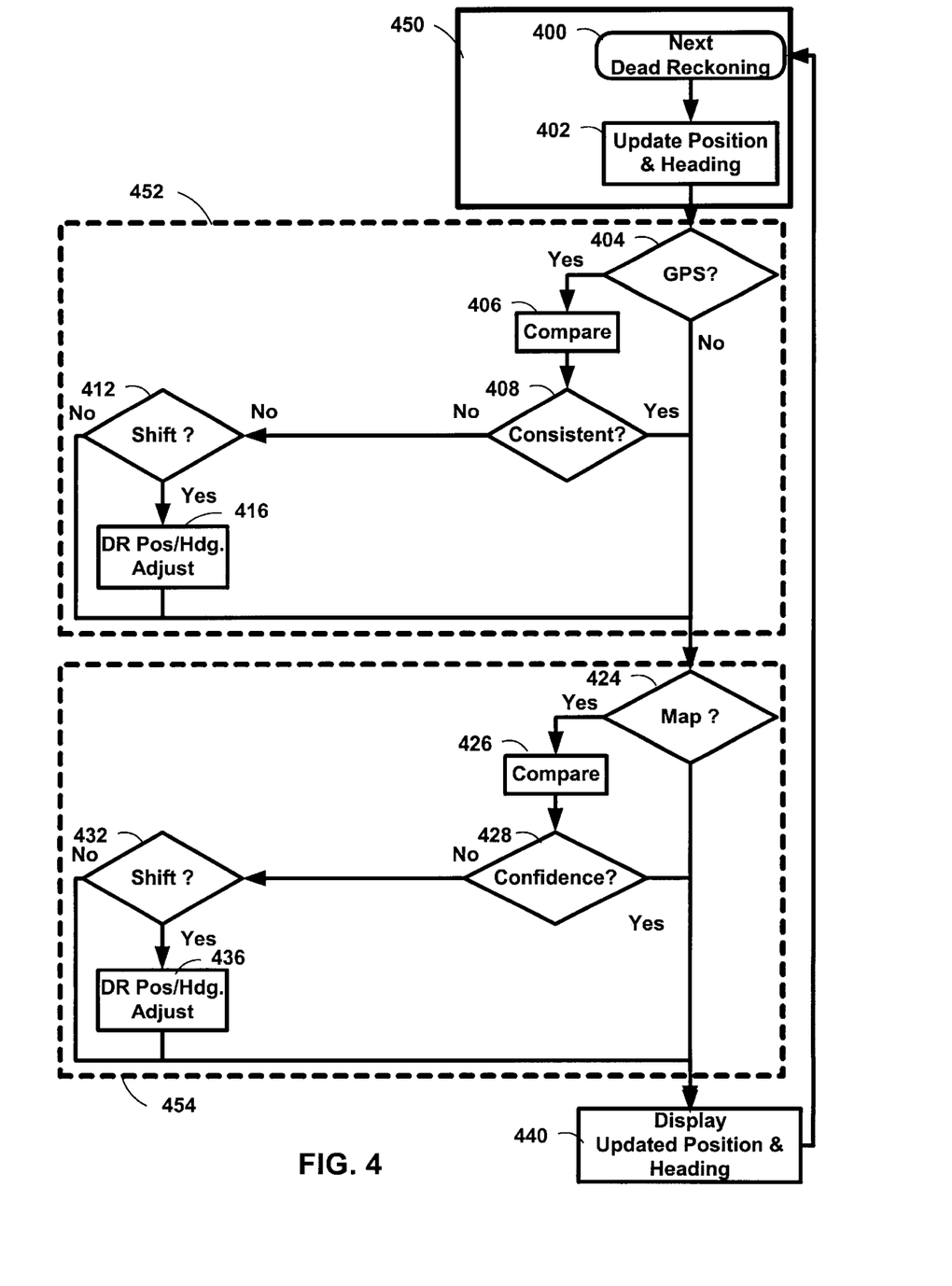
FIG. 4 is a process flow diagram of an embodiment of a hybrid vehicular navigation system in which primary navigation is accomplished by the dead reckoning system shown in FIG. 3 and secondary navigation is accomplished by a combination of GPS and map databases.
Figure 5:
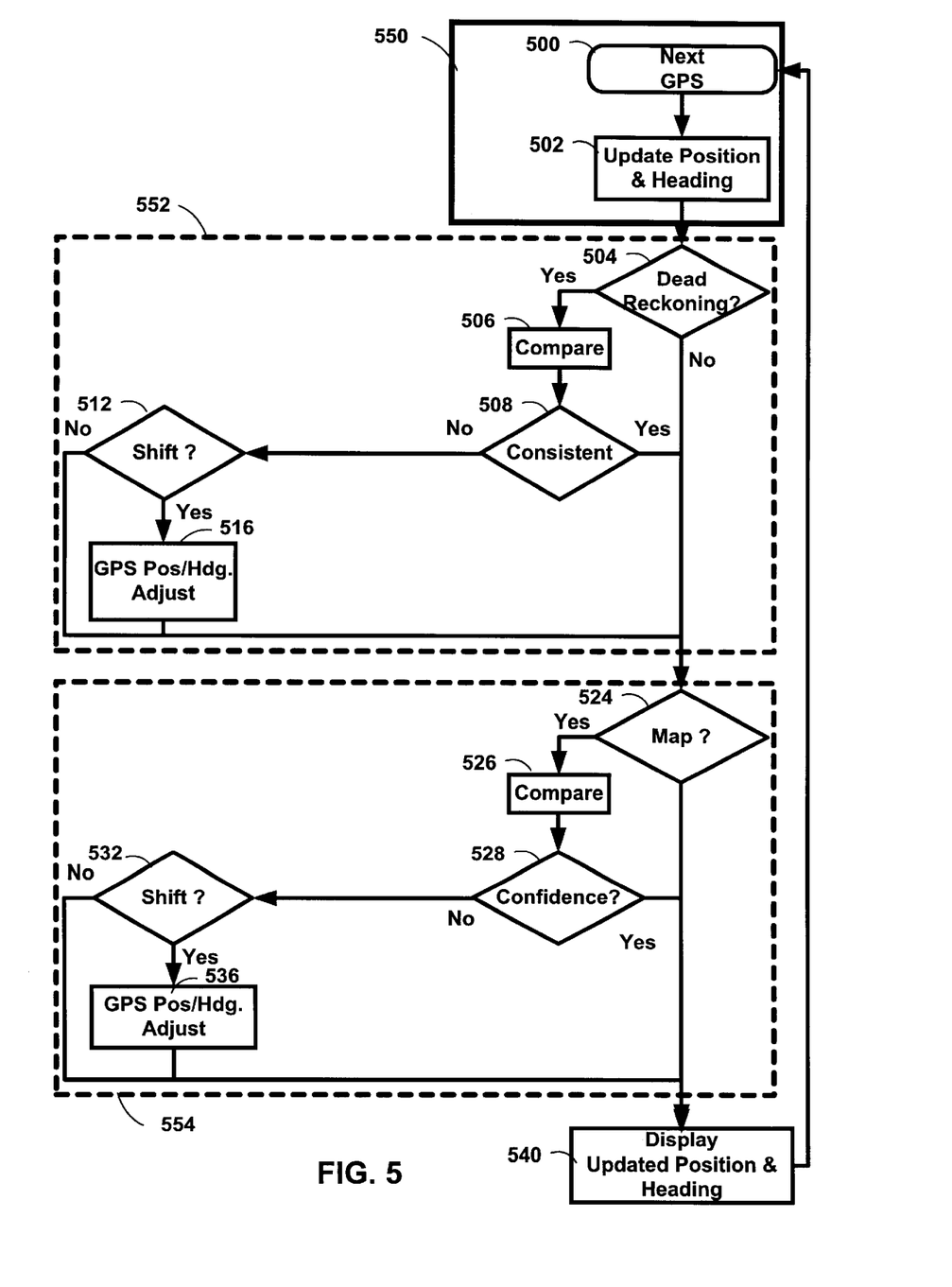
FIG. 5 is a process flow diagram of a hybrid vehicular navigation system in which primary navigation is accomplished by GPS and secondary navigation is accomplished by a combination of dead reckoning and map databases.

FIGS. 4–5 show two embodiments of the processes in which the dead reckoning/inertial guidance module serves in, respectively, a master-slave and slave-master relationship with the other vehicle position/heading determination means.

FIG. 4 shows a master-slave embodiment of the processes conducted within modification logic 308 (see FIG. 3). In this hybrid embodiment, the dead reckoning/inertial-guidance processes 450 serve in a master relationship to various other position/heading determination processes which are utilized for recalibration and/or shifting of the position and heading determinations made by the dead reckoning/inertial-guidance processes 450. In the embodiment shown, slave processes may include both GPS processes 452 and map database processes 454.

Processing in the dead reckoning logic 450 begins with process 400. In process 400, the next dead reckoning distance/heading determination is received via output 360 (see FIG. 3) by the modification logic 308. That determination may be in the form of an absolute distance and heading, or a distance and heading relative to a previous position and heading. In the latter case, the position and heading may be expressed as an incremental change in a velocity vector, as an acceleration vector, or as an incremental change in both distance and in heading. Control is then passed to process 402. In process 402, an updated position and heading is generated using the distance and heading outputs 360 from the Kalman filter. Control is then passed generally to the GPS based logic 452.

The first of the GPS logic processes is decision process 404. In decision process 404, a determination is made as to whether there is a new GPS reading that meets certain reliability requirements. The GPS information is matched with a corresponding sample of position information derived from dead reckoning. Where, for example, the GPS module 220 (see FIG. 3) is providing absolute measurements (e.g., position/heading) or relative measurements (e.g., a change in position/heading or a velocity vector), those measurements may not be utilized if they lack reliability. For example, GPS velocity vector measurements may not be deemed reliable when the magnitude of the measured velocity vector falls below a threshold value, e.g., 1.5 m/sec. In the event the time-tagged GPS data is not reliable, or not available for the interval of interest, then control is passed directly to map/database logic 454 for subsequent processing. Alternately, where reliable GPS information is available, control is passed to process 406. In process 406, the GPS data is compared with similar data from the dead reckoning module 300 (see FIG. 3) after any required parameter conversions have been made. Control is then passed the decision process 408. In decision process 408 a determination is made as to whether the GPS tagged data is consistent with the dead reckoning derived data. If this determination is in the affirmative, then control is passed directly to map database logic 454. Alternately, if the GPS datum is not consistent, then control is passed to decision process 412. In decision process 412, a determination is made as to whether the dead reckoning position and heading need to be corrected. If that determination is in the negative, control passes directly to the map database logic 454. Alternately, if a determination is made that a shift in the position and heading as determined by the dead reckoning logic 450 needs to be made to bring it into line with the momentarily more reliable GPS derived measurement, then control is passed to process 416. In process 416 the position and heading determined by the dead reckoning logic 450 is shifted to the position and heading determined by the GPS module. The determination to shift position and heading may be implemented only when certain threshold conditions are met. Where, for example, the data is inconsistent but the amount of inconsistency falls below a certain threshold, no position shift will be made. This avoids presenting a zigzag position determination to the user and the confusion that may produce. Where, however, the error exceeds a certain threshold, control will be passed to process 416. In process 416, the GPS determined position and heading will be moved towards a GPS derived position through a scale factor of the dead reckoning determined position and heading, and may be utilized as the base from which further dead reckoning determinations will be made. Control is then passed to map database logic 454.

Cumulative errors in dead reckoning process degrade its accuracy over a period of time. In order to reduce uncertainty in the true location of the vehicle, map-matching algorithms are utilized. When the dead-reckoning behavior indicates (through a turn, etc.) that vehicle is in a certain location on a particular road segment, the vehicle position may be adjusted to the position indicated on map, thereby eliminating the cumulative errors in the vehicle location. Map matching techniques work because unlike navigation in sea or air, for road transportation vehicles are usually constrained to a network of roads with only temporary excursions into parking lots, driveways, etc.

The first of the map database logic processes is decision process 424. In decision process 424, a determination is made as to whether map matching is operative. If map matching is not available for the interval of interest, then control is passed directly to process 440. Alternately, where map matching is available, control is passed to process 426. In process 426, road segment(s) from a probable map region are selected. Then the selected road segments are compared in terms of orientation to the heading of the vehicle and connectivity with both prior map and/or dead-reckoning positions. A best match is selected. Control is then passed to decision process 428. In decision process 428 the confidence level in the best matching location on the selected road segment is evaluated. If the confidence level falls above a required threshold control is passed to process 440. Alternately where confidence levels fall below acceptable levels control is passed to decision process 432.

In decision process 432 a determination is made as to whether the dead reckoning position and heading need to be corrected to improve the correlation between map matching and dead reckoning derived position estimates. If that determination is in the negative, control passes directly to process 440. Alternately, if a determination is made that a shift in the position and heading, as determined by the dead reckoning logic 450, needs to be made to bring it into line with the map matching processes, then control is passed to process 436. In process 436, the position and heading determined by the dead reckoning logic 450 is shifted to the position and heading determined by the map matching/database module. The determination to shift position and heading may be implemented only when certain threshold conditions are met. Where, for example, the data is inconsistent but the amount of inconsistency falls below a certain threshold, no position shift will be made. This avoids presenting a zigzag position determination to the user and the confusion that may produce. Where, however, the error exceeds a certain threshold, control will be passed to process 436. In process 436, the map matching/database determined position and heading will be substituted in place of the dead reckoning determined position and heading, and may be utilized as the base from which further dead reckoning determinations will be made. Control is then passed to process 440.

In process 440 the updated position and heading information is displayed to the user via the output communication module 242 (see FIG. 2).

FIG. 5 shows a master-slave embodiment of the processes conducted within modification logic 308 (see FIG. 3). In this hybrid embodiment, the dead reckoning/inertial-guidance process 452 and map matching/database processes 454 serve in a slave relationship to GPS position/heading determination processes 450. The dead reckoning and map matching processes are utilized for shifting the position and heading determinations made by the GPS logic 550, when conditions warrant.

Processing in the GPS logic 550 begins with process 500. In process 500, the next GPS distance/heading determination is received via GPS module 220 (see FIG. 3) by the modification logic 308. That determination may be in the form of an absolute position and heading, or a relative indicator of position and heading, such as a velocity vector, which when used in conjunction with previous vectors can be integrated to provide absolute position and heading. In the latter case, the position and heading may be expressed as an incremental change in a velocity vector, as an, or as an incremental change in both distance and in heading. Control is then passed to process 502. In process 502 an updated position and heading is generated using the GPS data. Control is then passed generally to the dead reckoning/ inertial-guidance logic 552.

The first of the dead reckoning/inertial-guidance processes is decision process 504. In decision process 504 a determination is made as to whether there is a new dead reckoning/inertial-guidance reading that meets certain reliability requirements. The dead reckoning/inertial-guidance information is correlated with GPS derived information. The dead reckoning/inertial-guidance module 300 (see FIG. 3) absolute measurements (e.g., position/heading), or relative measurements (e.g., a change in position/heading or a velocity vector), may not be utilized if they lack reliability. In the event the dead reckoning/inertial-guidance data is not reliable, or not available for the interval of interest, then control is passed directly to map/database logic 554 for subsequent processing. Alternately, where reliable dead reckoning/inertial-guidance information is available, control is passed to process 506. In process 506, the dead reckoning/ inertial-guidance data is compared with data from the GPS module 220 (see FIG. 3) after any required parameter conversions have been made. Control is then passed to the decision process 508. In decision process 508 a determination is made as to whether the dead reckoning/inertial-guidance tagged data is consistent with the GPS derived data. If this determination is in the affirmative, then control is pass directly to map database logic 554. Alternately, if the datum is not consistent, then control is passed to decision process 512. In decision process 512 a determination is made as to whether the dead reckoning position and heading needs to be corrected. If that determination is in the negative, control passes directly to the map database logic 554. Alternately, if a determination is made that a shift in the position and heading as determined by the GPS logic 550 needs to be made to bring it into line with the momentarily more reliable dead-reckoning/inertial-guidance derived measurement, then control is passed to process 516. In process 516 the position and heading determined by the GPS logic 550 is shifted to the position and heading determined by the dead reckoninglinertial-guidance module. The determination to shift position and heading may be implemented only when certain threshold conditions are met. Where, for example, the data is inconsistent but the amount of inconsistency falls below a certain threshold, no position shift will be made. This avoids presenting a zigzag position determination to the user and the confusion that may produce. Where, however, the error exceeds a certain threshold, control will be passed to process 516. In process 516, the dead reckoning/inertial-guidance determined position and heading will be substituted in place of the GPS determined position and heading. Control is then passed to map matching/database logic 554.

The first of the map database logic processes is decision process 524. In decision process 524, a determination is made as to whether map matching is operative. If map matching is not available for the interval of interest, then control is passed directly to process 540. Alternately, where map matching is available, control is passed to process 526. In process 526, road segment(s) from a probable map region are selected and various road segments are compared in terms of orientation to the heading of the vehicle and in terms of connectivity with both prior map and/or dead-reckoning positions and a best match is selected. Control is then passed to decision process 528. In decision process 528 the confidence level in the best matching location on the road segment is evaluated. If it falls above a required threshold control is passed to process 540. Alternately where confidence levels fall below acceptable levels control is passed to decision process 532.

In decision process 532 a determination is made as to whether the dead reckoning position and heading need to be corrected to improve the correlation between map matching and dead reckoning derived position estimates. If that determination is in the negative, control passes directly to process 540. Alternately, if a determination is made that a shift in the position and heading as determined by the dead reckoning logic 550 needs to be made to bring it into line with the map matching processes implemented using the map matching database, then control is passed to process 536. In process 536, the position and heading determined by the dead reckoning logic 550 is shifted to the position and heading determined by the map matching module. The determination to shift position and heading may be implemented only when certain threshold conditions are met. Where, for example, the data is inconsistent but the amount of inconsistency falls below a certain threshold, no position shift will be made. This avoids presenting a zigzag position determination to the user and the confusion that may produce. Where, however, the error exceeds a certain threshold, control will be passed to process 536. In process 536, the map matching determined position and heading will be substituted in place of the dead reckoning determined position and heading, and may be utilized as the base from which further dead reckoning determinations will be made. Control is then passed to process 540.

In process 540 the updated position and heading information is displayed to the user via the output communication module 242 (see FIG. 2).

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. An inertial guidance system for navigation of a vehicle having a body plane angle associated therewith, said inertial guidance system comprising:

an inertial guidance sensor for coupling to the vehicle, and for sensing motion of the vehicle in a non-inertial frame of reference and forming an angular motion signal and an acceleration signal corresponding thereto;

a frame transformation unit coupled to receive the angular motion and acceleration signals, correct the angular motion signal using body plane angle data derived from the acceleration signal, and correct the acceleration signal using a rotation matrix representing the corrected angular motion signal, thereby transforming the angular motion and acceleration signals into a quasi-inertial frame of reference; and a logic unit coupled to receive the corrected angular motion and acceleration signals formed by said frame transformation unit, said logic unit for converting the corrected angular motion and acceleration signals into an estimated position and heading of the vehicle.

2. The inertial guidance system of claim 1, wherein the inertial guidance sensor further comprises:

an acceleration sensor for coupling to the vehicle, and the acceleration sensor forming a z axis raw acceleration signal and an x axis raw acceleration signal, and the z axis raw acceleration signal corresponding to an acceleration of the vehicle along a z axis substantially normal to a chassis of the vehicle, and the x axis raw acceleration signal corresponding to an acceleration of the vehicle along an x axis substantially aligned with a direction of motion of the vehicle.

3. The inertial guidance system of claim 1, wherein the inertial guidance sensor further comprises:

an angular rate sensor to measure an angular rotation rate of the vehicle; and an accelerometer to measure an acceleration of the vehicle.

4. The inertial guidance system for vehicle navigation of claim 3, wherein the angular rate sensor comprises at least one of: an inclinometer and an angular rate sensor together with an integrator.

5. The inertial guidance system of claim 1, wherein the angular motion signal represents angular rotation of the vehicle in a non-inertial frame of reference and the acceleration signal represents an acceleration of the vehicle in a non-inertial frame of reference.

6. The inertial guidance system for vehicle navigation of claim 1, wherein the the body plane angle data is derived from the projections into the acceleration signal of at least one of a gravitational constant and a magnitude of a gravity vector at a location of the vehicle.

7. The inertial guidance system for vehicle navigation of claim 1, wherein the logic unit comprises at least one of: a Kalman filter and a covariance filter.

8. The inertial guidance system of claim 5, wherein the body plane angle data is derived from the projections into the acceleration signal of at least one of a gravitational constant and a magnitude of a gravity vector at a location of the vehicle; and wherein the angular motion signal is corrected in an inertial rotation module by a scale factor corresponding with the body plane angle.

9. The inertial guidance system for vehicle navigation of claim 8, wherein in a rotation matrix module the acceleration signal is corrected by matrix multiplication of the rotation matrix and an acceleration matrix representing the acceleration signal.

10. A hybrid system for navigation of a vehicle having a body plane angle associated therewith, said hybrid system comprising:

an inertial guidance sensor for coupling to the vehicle, and for sensing motion of the vehicle in a non-inertial frame of reference and forming an angular motion signal and an acceleration signal corresponding thereto;

a frame transformation unit coupled to receive the angular motion and acceleration signals, correct the angular motion signal using body plane angle data derived from the acceleration signal, and correct the acceleration signal using a rotation matrix representing the corrected angular motion signal, thereby transforming the angular motion and acceleration signals into a quasi-inertial frame of reference;

a first logic unit coupled to receive the corrected angular motion and acceleration signals formed by said frame transformation unit, said logic unit for converting the corrected angular motion and acceleration signals into a first estimated position and heading of the vehicle;

a position and heading determination means for forming a second estimated position and heading of the vehicle; and a second logic unit coupled to receive the first estimated position and heading signal formed by the first logic unit, together with the second estimated position and heading signal formed by said position and heading determination means and for estimating the position and heading of the vehicle therefrom.

11. The hybrid system for navigation of a vehicle of claim 10, wherein said first logic unit comprises at least one of: a Kalman filter and a covariance filter.

12. The hybrid system for navigation of a vehicle of claim 10, wherein said second position and heading determination means comprises at least one of: a GPS system, a WAAS system and a map database together with map matching processes.

13. A hybrid system for navigation of a vehicle, and said hybrid system comprising:
- an inertial guidance sensor for coupling to the vehicle, and for sensing motion of the vehicle in a non-inertial frame of reference and forming sensor signals corresponding thereto;
- a frame transformation unit coupled to receive the sensor signals formed by the inertial guidance sensor, said frame transformation unit for transforming the sensor signals into a quasi-inertial frame of reference and forming a first signal corresponding to an acceleration of the vehicle in a quasi-inertial reference frame and an angulation of the vehicle in a quasi-inertial reference frame;
- a first logic unit coupled to receive the first signal formed by said frame transformation unit, said logic unit for converting the first signal into a first estimated position and heading of the vehicle;
- a position and heading determination means for forming a second estimated position and heading of the vehicle, said position and heading determination means having a map database together with map matching processes, and said map database including data corresponding to inclinations for each of a plurality of road segments; and
- a second logic unit coupled to receive the first estimated position and heading signal formed by the first logic unit, together with the second estimated position and heading signal formed by said position and heading determination means and for estimating the position and heading of the vehicle therefrom,
- wherein said frame transformation unit utilizes said inclinations for a road segment corresponding with a location of the vehicle, for transforming a portion of the first signal corresponding to the angulation of the vehicle.

14. The hybrid system for navigation of a vehicle of claim 13,
- wherein said second position and heading determination means includes a map database together with map matching processes, and said map database including data corresponding to inclinations for each of a plurality of road segments;
- wherein said sensor signals include an acceleration signal corresponding to the acceleration of the vehicle in a non-inertial frame of reference and an angular signal corresponding to the angle of the vehicle in a non-inertial frame of reference; and wherein said frame transformation unit derives from the acceleration signal a gravity angle corresponding to the angle with respect to the gravity vector of the non-inertial frame of reference, and further utilizes inclinations for a road segment corresponding with a location of the vehicle to modify a gain factor applied to the combination of the gravity angle with the angulation signal to generate the portion of the first signal corresponding to the angulation of the vehicle in a quasi-inertial reference frame.

15. The hybrid system for navigation of a vehicle of claim 14, wherein said frame transportation unit further utilizes at least one of: a history of the effect of each gain factor on calculated angles for common maneuvers, a data corresponding to a particular driving style to modify the gain factor.

16. A method for navigating a vehicle having a body plane angle associated therewith comprising the acts of:
- detecting an initial position and an initial heading of the vehicle;
- sensing a motion of the vehicle in a non-inertial frame of reference and generating an angular motion signal and an acceleration signal corresponding to the motion;
- transforming the motion sensed into motion within a quasi-inertial frame of reference by correcting the angular motion signal using body plane angle data derived from the acceleration signal, and correcting the acceleration signal using a rotation matrix representing the corrected angular motion signal;
- converting the motion within a quasi-inertial frame of reference into a position change and a heading change; and
- adding the position change to the initial position and the heading change to the initial heading to form respectively an updated position estimate and an updated heading estimate.

17. The method for navigating a vehicle of claim 16,
- wherein the acceleration signal is generated by sensing along a first axis substantially normal to a chassis of the vehicle and a second axis substantially aligned with a direction of travel of the vehicle; and
- wherein the body plane angle is derived from the acceleration signal by projecting the first axis and the second axis into a quasi-inertial frame of reference such that the projected acceleration of the vehicle along the first axis in the quasi-inertial frame of reference corresponds to at least one of a gravitational constant and a magnitude of a gravity vector at a location of the vehicle.

18. The method for navigating a vehicle of claim 16,
- wherein the sensing act further comprises the acts of:
  - measuring an acceleration of the vehicle in a non-inertial frame of reference;
  - measuring an angular motion of the vehicle in the non-inertial frame of reference; and
- wherein the transforming act further comprises the acts of:
  - correlating a vertical component of the acceleration of the vehicle measured in said first measuring act with at least one of a gravitational constant and a magnitude of a gravity vector at a location of the vehicle;
  - generating a gravity angle responsive to said correlating act and the gravity angle corresponding to an angular rotation of the non-inertial reference frame with respect to a quasi-inertial reference frame; and
  - correcting the angular motion of the vehicle sensed in said second measuring act by an amount corresponding with the gravity angle.

19. The method for navigating a vehicle of claim 18, further comprising the act of:
- multiplying the rotation matrix corresponding to a corrected angular motion of the vehicle determined in said correcting act with an acceleration matrix corresponding to the acceleration of the vehicle determined in said first measuring act.

20. A computer program product for navigating a vehicle, and the computer program product comprising:
- a computer-readable storage medium having computer-readable program code means embodied in the medium, the computer-readable program code means comprising:
  - computer-readable program code means for detecting an initial position and an initial heading of the vehicle;
  - computer-readable program code means for sensing a motion of the vehicle in a non-inertial frame of reference and generating an angular motion signal and an acceleration signal corresponding to the motion;

computer-readable program code means for transforming the motion senses in said act of sensing into motion within quasi-inertial frame of reference by correcting the angular motion signal using body plane angle data derived from the acceleration signal, and correcting the acceleration signal using a rotation matrix representing the corrected angular motion signal;

computer-readable program code means for converting the motion with a quasi-inertial frame of reference into a position change and a heading change; and computer-readable program code means for adding the position change to the initial position and the heading change to the initial heading to form respectively an updated position estimate and an updated heading estimate.

21. The computer readable program product of claim 20, wherein the computer-readable program code means for sensing a motion further comprises:

computer-readable program code means for sensing an acceleration of the vehicle along a first axis substantially normal to a chassis of the vehicle and a second axis substantially aligned with a direction of travel of the vehicle to generate the acceleration signal; and wherein the computer-readable program code means for transforming further comprises:

computer-readable program code means for projecting the first axis and the second axis into a quasi-inertial frame of reference such that the projected acceleration of the vehicle along the first axis in the quasi-inertial frame of reference corresponds to at least one of: a gravitational constant and a magnitude of a gravity vector at a location of the vehicle.

22. The computer readable program product of claim 20, wherein the computer-readable program code means for sensing further comprises:

computer-readable program code means for sensing an acceleration of the vehicle along a first axis substantially normal to a chassis of the vehicle and a second axis substantially aligned with a direction of travel of the vehicle to generate the acceleration signal; and wherein the computer-readable program code means for transforming further comprises:

computer-readable program code means for deriving the body plane angle from the acceleration signal by projecting the first axis and the second axis into a quasi-inertial frame of reference such that the projected acceleration of the vehicle along the first axis in the quasi-inertial frame of reference corresponds to at least one of: a gravitational constant and a magnitude of a gravity vector at a location of the vehicle; and computer-readable program code means for subtracting the body plane angle derived and corresponding to a rotation of the chassis of the vehicle relative to the quasi-inertial frame of reference from the angular motion of the vehicle sensed.

* * * * *